United States Patent [19]
Ernst

[11] Patent Number: 5,649,084
[45] Date of Patent: Jul. 15, 1997

[54] METHOD FOR PERFORMING BOOLEAN OPERATIONS ON GEOMETRIC OBJECTS IN A COMPUTER-AIDED DESIGN SYSTEM

[75] Inventor: Peter Ernst, Sindelfingen, Germany

[73] Assignee: Hewlett-Packard Company, Palo Alto, Calif.

[21] Appl. No.: 377,852

[22] Filed: Jan. 25, 1995

[30] Foreign Application Priority Data

Apr. 28, 1994 [EP] European Pat. Off. ............ 94106673

[51] Int. Cl.$^6$ .................................................. G06F 15/00
[52] U.S. Cl. ............................................................ 395/135
[58] Field of Search .................................. 395/119, 120, 395/135, 141, 142, 121

[56] References Cited

U.S. PATENT DOCUMENTS 5,557,719  9/1996  Ooka et al. ............................ 395/141

OTHER PUBLICATIONS

"Boolean Set Operations on Non-Manifold Boundary Representation Objects", E. Gursoz et al., Computer-Aided Design 23 (1991) Jan./Feb. No. 1 London, GB.

"Ray Casting for Modeling Solids", S. Roth, Computer Graphics and Image Processing 18, 109–144 (1982).

"Computational Geometry in Practice", A. Forrest, NATO ASI Series vol. F17, Fundamental Alogrithms for Computer Graphics, 1985.

Primary Examiner—Phu K. Nguyen

[57] ABSTRACT

In a method for performing Boolean operations on geometric objects to generate a modified geometric object in a computer-aided design system, a face of a first object and a face of a second object are intersected to generate graph edges which form edges of the modified geometric object. Edges of the first object are intersected with surfaces of the second object to produce intersection points, and surfaces containing the faces of the two objects, respectively, are intersected with each other to produce intersection tracks. If there is an inconsistency between the intersection points and corresponding intersection tracks, i.e., if intersection points which should ideally lie on an intersection track are more than a resolution value (epsilon) apart, a perturbation step is applied to correct the spatial positions of inconsistent intersection points. The perturbation step comprises moving the inconsistent points along edges to a position where geometric consistency is established.

7 Claims, 12 Drawing Sheets

METHOD FOR PERFORMING BOOLEAN OPERATIONS ON GEOMETRIC OBJECTS IN A COMPUTER-AIDED DESIGN SYSTEM

The invention relates to a method for performing Boolean operations on geometric objects in a computer-aided design (CAD) system. In the design of physical objects, for example machine pads, it is often necessary to perform Boolean operations with two or several objects such as uniting the objects, subtracting one object from the other or intersecting the objects. The present invention deals with the performance of Boolean operations in a 3D CAD system which is capable of storing a graphical representation of the physical objects and displaying them three-dimensionally (3D) in an isometric view.

BACKGROUND OF THE INVENTION

CAD systems are widely used in the design of mechanical or electronic parts or other objects and there are several commercially available systems of that type. A common characteristic of these systems is that the objects are designed by the user in an interactive mode. That means that the object is displayed on a screen as far as it has been designed by the user and the user can enter commands to apply modifications and/or additions to the already existing structure.

For displaying the geometric object under design, typically a cathode ray tube (CRT) or a liquid crystal display (LCD) is used. The object is displayed in an isometric view, whereby it can additionally be illuminated by computer generated light sources to yield realistic three-dimensional images. The commands for supplementing or modifying the object are entered by a computer mouse, a graphics tablet, or a light pen. When the editing process is finished and the object to be designed has assumed its final shape, a hardcopy can be produced by a printer or plotter.

An example for a commercially available 3D CAD system is the Hewlett-Packard Precision Engineering Solid Designer Version 2.0. A description of a 3D CAD system is also known from I. C. Braid :"Notes on a geometric modeller", C.A.D. Group Document No. 101, University of Cambridge, June 1979. Another description of a 3D CAD system is known from the article by I. C. Braid et al.: "Stepwise Construction of Polyhedra in Geometric Modelling", in K. W. Brodlie (Ed.): "Mathematical Methods in Computer Graphics and Design", Academic Press, 1980.

In the meantime, several CAD systems have been developed, for example the above mentioned system by Hewlett-Packard, which have the capability to perform Boolean operations like UNITE, SUBTRACT, or INTERSECT on geometric objects. In order to be able to create a wide range of complex objects, solid modellers must robustly support Boolean operations. Existing CAD systems, however, are not satisfactory in all respects since they are not able to perform Boolean operations with all desirable geometric configurations. In particular tangential or almost tangential geometries where a shallow intersection of surfaces has to be performed for executing the Boolean operation introduce numerical inconsistencies large enough to make the operation fail. Due to such errors in the calculation of intersections, the CAD system either produces an error message that it cannot execute the operation or the geometric object resulting from the operation does not have the shape which it should have in the ideal situation. The mentioned problems also occur with partially coincident geometries where edges of a face of the geometric object and intersection lines between a surface containing this face and another surface containing a face of the other geometric object are nearly coincident.

As already mentioned, the computation of the boundary of a solid which is defined as the result of a Boolean operation requires algorithms for surface/surface intersections, for curve/surface intersections, and for curve/curve intersections. To yield a sound boundary, these intersections must be consistent to a degree determined by the resolution of the model. The resolution specifies the allowable error (epsilon) that can be tolerated before the model "falls apart". For example, a curve is still considered to lie in a specific surface if it is not more than epsilon away from the surface, and three edges which miss each other by less than epsilon are still considered to intersect at a common vertex. An important step in the calculation of the boundary of a solid (e.g., the result of a Boolean operation) is the construction of the intersection graph which describes a segment of a surface/surface intersection track that is inside both intersecting faces. In connection with the construction of the intersection graph, it may occur that intersection points which should ideally be coincident with the intersection track are more than epsilon apart so that no consistent geometric object can be constructed, i.e., the model falls apart.

There are two methods usually employed to cope with the mentioned problems:
1. Numerical methods to increase the accuracy of curve/surface intersections. This approach is only applicable for very special combinations of curves and surfaces. The corresponding algorithms are comparatively slow and still do not return reliable results in numerically ill defined situations.
2. Methods using curve/curve intersections instead of curve/surface intersections. The disadvantage of such methods is that curve/curve intersections are numerically less stable than curve/surface intersections, because three-dimensional curves hardly ever meet at a common point due to the limited numerical resolution.

SUMMARY OF THE INVENTION

It is thus an object of the present invention to provide a method for performing Boolean operations on geometric objects and a corresponding CAD system which has an increased reliability and robustness.

It is a further object of the invention to permit performance of Boolean operations with high speed and high numerical stability.

According to the invention, these objects are achieved by a method as defined in claim 1 and by a CAD system as defined in claim 7. The invention thus provides a method for performing Boolean operations on geometric objects in a computer-aided design system for generating a modified geometric object, wherein a face of a first geometric object and a face of a second geometric object are intersected to generate a graph edge forming an edge of the modified geometric object, which comprises the steps of:
  a) intersecting an edge of the first geometric object with a surface containing a face of the second geometric object for producing intersection points,
  b) intersecting a surface containing a face of the first geometric object with a surface containing a face of the second geometric object for producing intersection tracks,
  c) determining if the distances between the intersection points and the intersection tracks are smaller than a resolution value (epsilon), respectively, d) correcting the spatial positions of the intersection points, if the distances determined in step c) are larger than the resolution value (epsilon), respectively.

According to an underlying principle of the invention, a perturbation method is applied to curve/surface intersection points to remove any geometric inconsistencies. Basically, the inconsistencies are resolved by relocating inconsistent intersections points to a desired surface/surface intersection, or at least to a position which is not farther away from the surface/surface intersection than the resolution value (epsilon). The target point of the relocation can be determined by a curve/curve intersection method. The relocation (perturbation) of the intersection points introduces an additional error, but it has the effect that the overall error is minimized and that consistency of geometric object is established.

The invention can be used with any type of solid modelling methods, for example the method called "boundary representations (B-rep)". An additional advantage of the invention is that it facilitates the use or exchange of standard geometric libraries containing, for example, intersection routines, because of the stabilisation of the results.

BRIEF DESCRIPTION OF THE DRAWINGS

In the following, embodiments of the invention will be explained in detail with reference to the drawings.

DETAILED DESCRIPTION OF THE INVENTION

Figure 1:
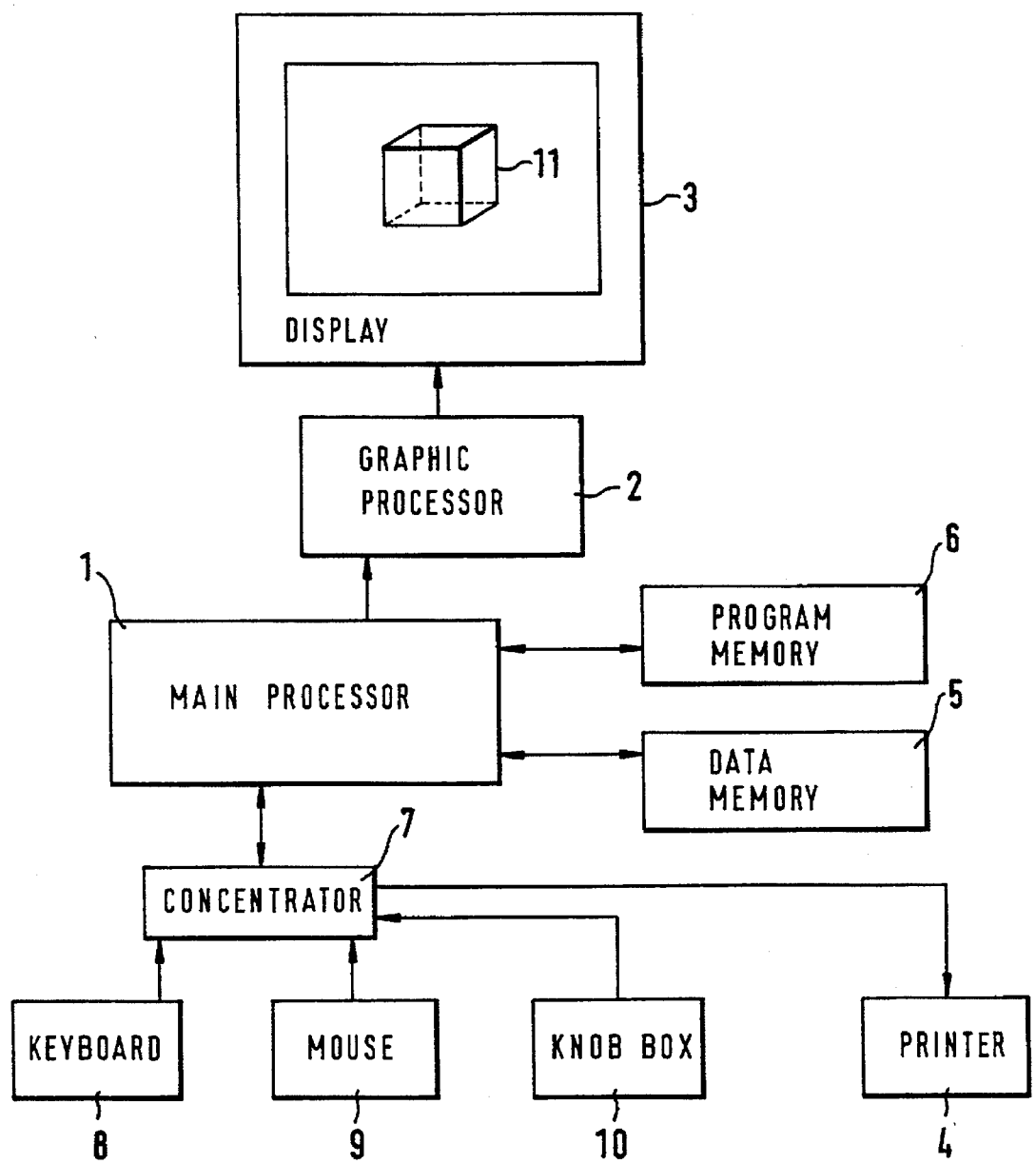
FIG. 1 schematically shows the components of a 3D CAD system incorporating the present invention.

FIG. 1 is a schematic diagram showing the typical components of a 3D CAD system. A main processor 1 is connected via a graphic processor 2 to a display screen 3, for example a CRT. The geometric object 11 under design is displayed on the screen 3. The main processor 1 performs the calculations for creating and modifying the geometric object displayed on the screen 3. A printer 4 is connected via a concentrator 7 to the main processor 1. The printer 4 can produce a hardcopy of the image displayed on the screen 3 or a hardcopy of geometric objects stored in the data memory 5 of the CAD system. The data memory 5 is connected to the main processor 1 and comprises a mass storage device such as a magnetic or an optical disk. A program memory 6 contains the instructions which are used in the creation and manipulation of the geometric object under design.

There are several input means which are available to the user for interaction with the CAD system. In the embodiment shown, there is a computer mouse 9 which controls a cursor displayed on the screen 3. Also displayed on the screen 3 is a command menu from which the user may select desired commands by positioning the cursor at the displayed option by appropriate movement of the mouse 9 and by pressing an activation key. An example of a displayed menu option is the addition or removal of certain parts from the object displayed on the screen, such as the application of a bore through the object. Another example of an option which can be selected is, in accordance with the present invention, the performance of a Boolean operation with displayed objects. In addition to the mouse 9, a keyboard 8 is provided for entering commands or data into the processor 1. A further input means is a knob box 10 which comprises a plurality of knobs by means of which the object displayed on the screen 3 can be rotated around various axes and linearly shifted in specific directions. It is understood that instead of or in addition to the just described input means alternative input means can be provided, such as a graphics tablet or a light pen. What is only important is that the input means give the user the possibility to manipulate the objects displayed on the screen 3 in a desired way, and especially to perform Boolean operations on these objects.

Figure 2:
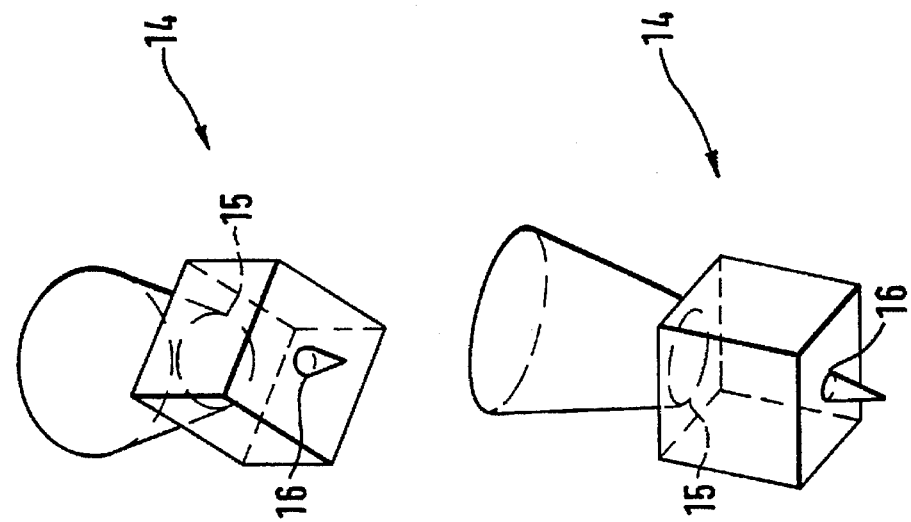
FIG. 2 illustrates a Boolean operation in a CAD system.
Figure 2:
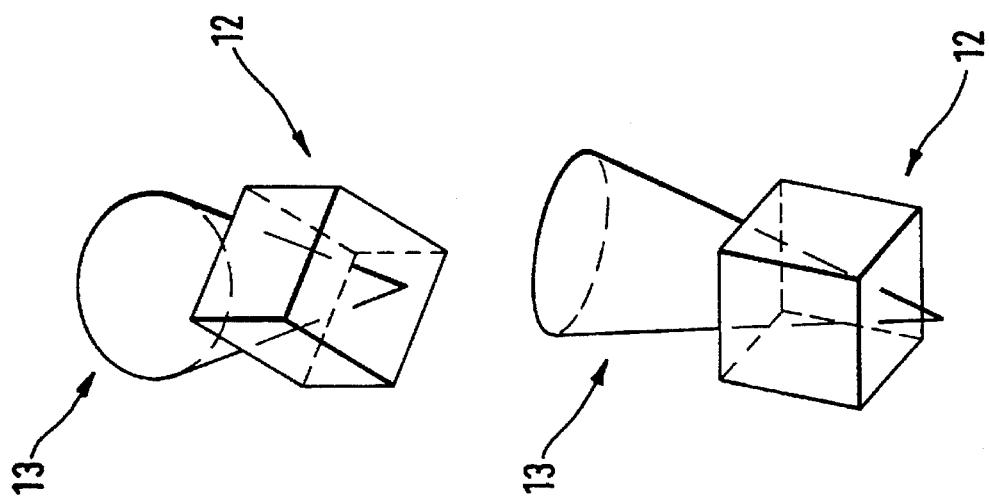

FIG. 2 illustrates the Boolean operation UNITE with the example of a cube 12 and a cone 13. The left part of FIG. 2 shows two different perspective views of the cube 12 and the cone 13 before the performance of the UNITE operation; the right part shows the result of the UNITE operation, also in two different perspective views. In the united object 14 shown in the right part of FIG. 2, the common edges 15 and 16 between the original cube and the original cone, i.e., the intersection edges, are shown.

Figure 3:
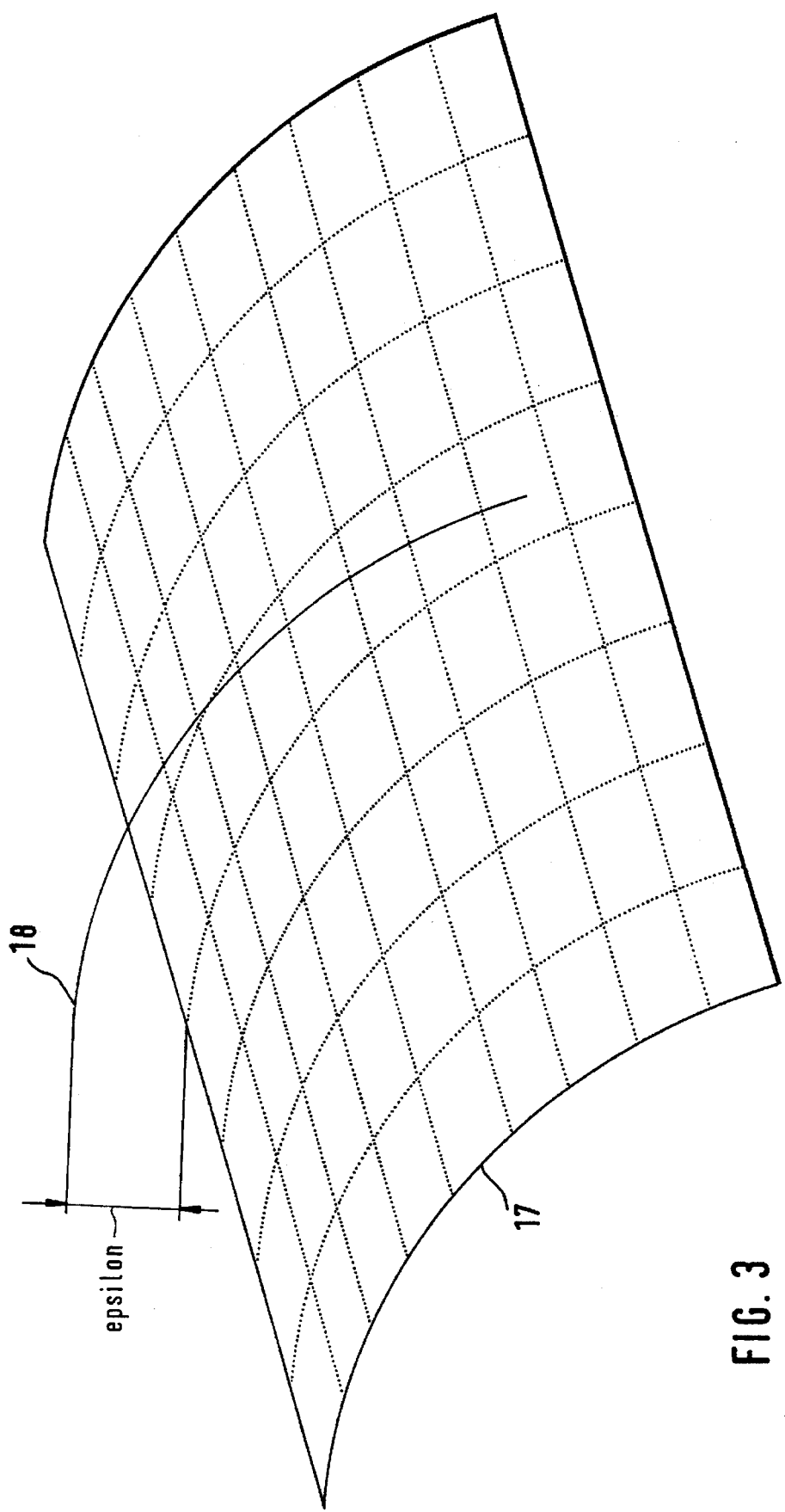
FIG. 3 shows an example for illustrating the resolution in a CAD system.
Figure 4:
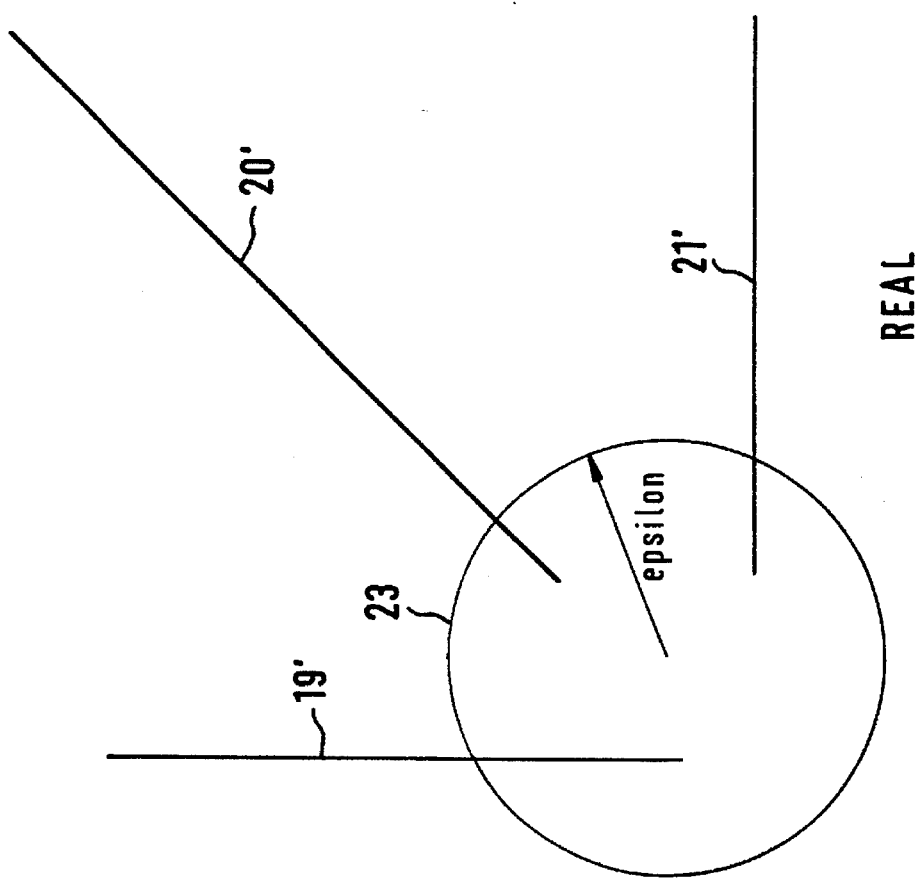
FIG. 4 shows another example for illustrating the resolution.
Figure 4:
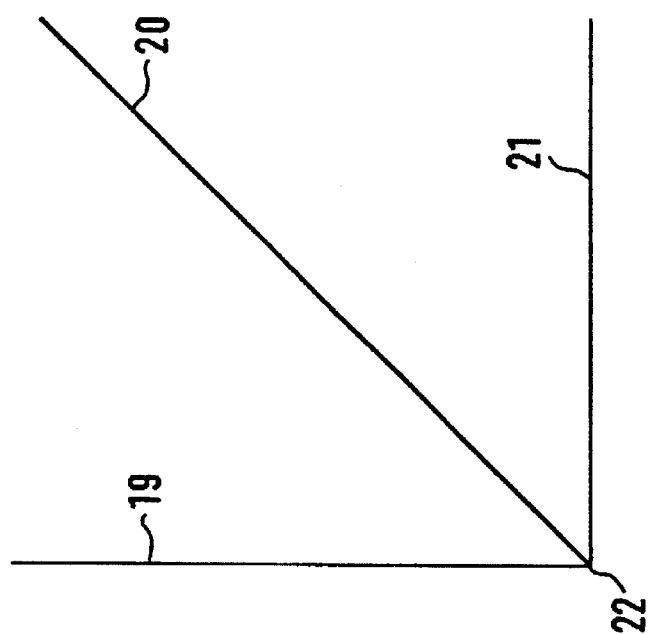

FIGS. 3 and 4 illustrates the term "resolution" which plays an important role in the subsequent description. The resolution (epsilon) is the maximum allowable error that is still tolerated by the CAD system before geometric elements (e.g., points, lines, faces) are considered as separate elements by the system. FIG. 3 illustrates the containment of a curve 18 on a surface 17. The curve 18 is shown to be a distance (epsilon) off the surface 18. Since the distance between the curve and the surface is not larger than the resolution (epsilon), the CAD system considers the curve 18 to lie in the surface 17.

FIG. 4 shows three edges 19, 20, 21 which are meant to intersect at a common vertex 22. The ideal situation where the three edges actually meet at a common point 22 is shown in the left part. In real CAD systems, however, numerical errors and instability may have the consequence that the edges 19', 20', and 21' miss each other as shown in the right part of FIG. 4. If the error is within the resolution (epsilon) as illustrated by the sphere 23 having a radius (epsilon), the vertex is still considered as being consistent. If the error becomes larger than the resolution, the model "falls apart" and the system does not associate a common vertex with the three edges. The resolution usually depends on the type of models built with the CAD system and is typically adjustable by the user.

The present invention addresses such inconsistencies where, for example, edges do not exactly meet at the common vertices. These situations commonly appear during the calculation of an intersection graph in the performance of a Boolean operation. For performing a Boolean operation, faces of the geometric objects on which the Boolean operation is to be performed have to be intersected. The faces to be intersected are contained in surfaces. An intersection graph is a segment of the intersection track between such two surfaces (surface/surface intersection track) which lies inside the two faces which are intersected. The intersection graph construction is an essential step in the calculation of the boundary of the solid corresponding to the result of the Boolean operation. The reliability of the intersection graph construction directly impacts the success or failure of the Boolean operation.

Figure 5:
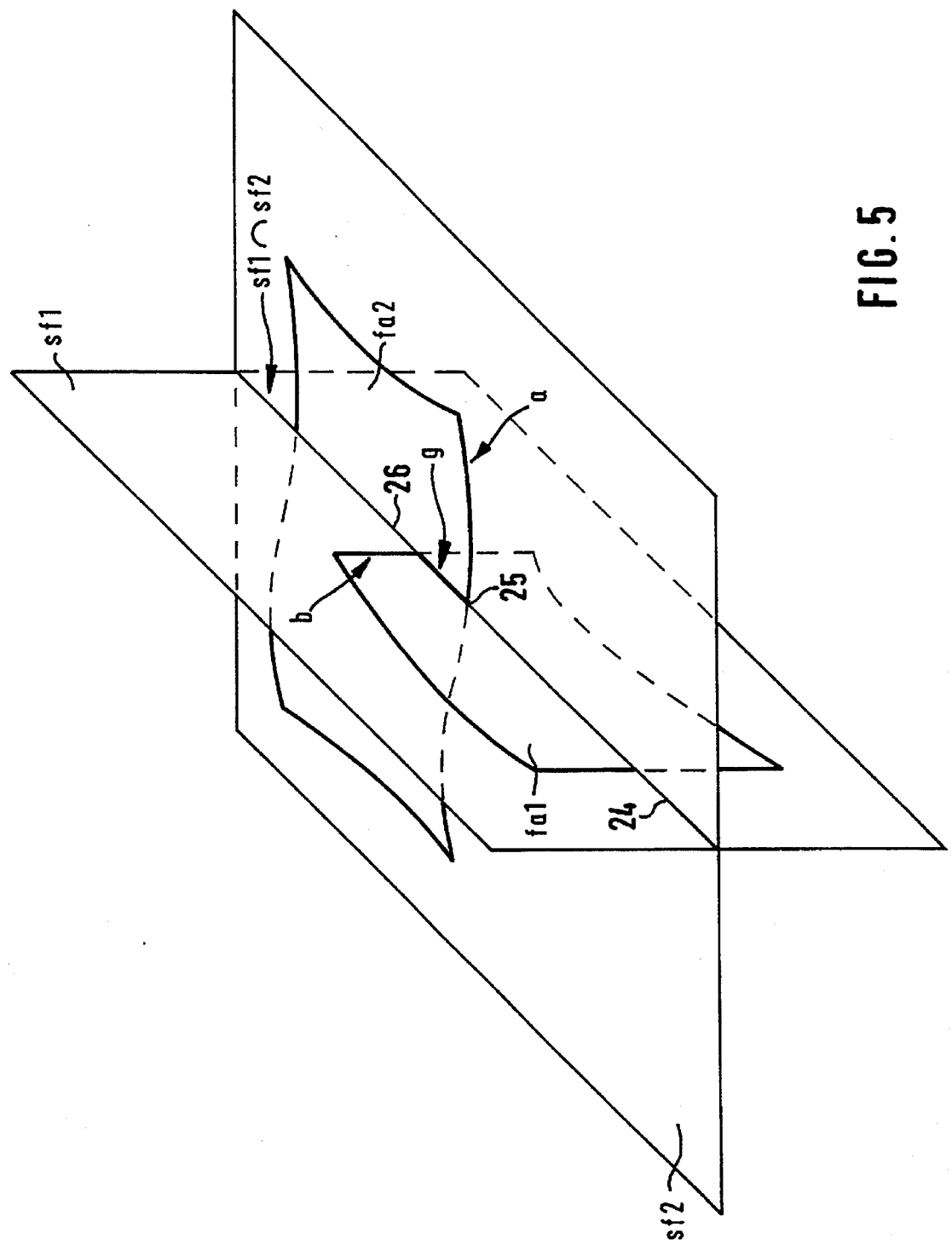
FIG. 5 illustrates the intersection of faces for performing a Boolean operation.

FIG. 5 shows two intersecting surfaces sf1 and sf2. Each surface carries a face, i.e., a limited region within the surfaces, respectively. The surface sf1 contains the face fa1 and the surface sf2 contains the face fa2. Only a part of the whole surface/surface intersection track 24 lies inside both faces fa1 and fa2. This pad is the intersection graph g. The intersection will subsequently also be denoted with the symbol ∩. Thus, the intersection track 24 corresponds to sf1∩sf2.

Usually, the points needed to trim the intersection graph g off the whole surface/surface intersection track 24 are obtained by intersecting the boundary curves of the face fa1 with the surface sf2 and by intersecting the boundary curves of the face fa2 with the surface sf1. In the example shown in FIG. 5, the boundary curve a of the face fa2 intersected with the surface sf1 yields a point 25 and the boundary curve b of the face fa1 intersected with the surface sf2 yields a point 26. The points 25 and 26 represent the trimming points required to define the intersection graph g which is inside both faces fa1 and fa2. The exactness with which these trimming points can be obtained determine the success of the Boolean operation. As will be explained below, the present invention provides for a method to correct inaccurate trimming points to ensure that a consistent representation of the boundary of a solid can be constructed.

Figure 6:
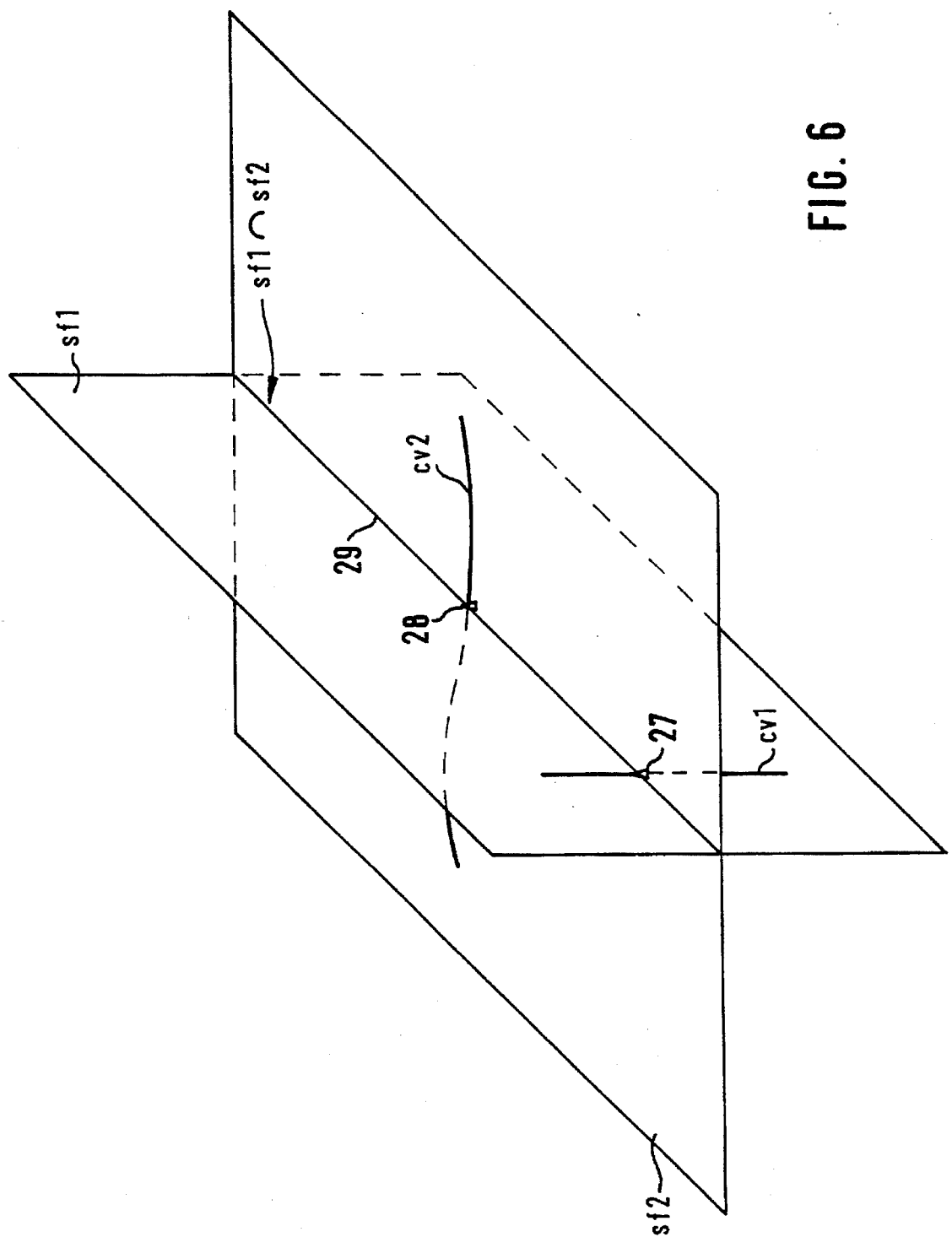
FIG. 6 illustrates the mutual containment of different intersections in an ideal situation.

Before describing the method of the invention in detail, another mathematically exact situation will be discussed with reference to FIG. 6. Ideally, the intersection of a curve on a specific surfaces with another surface is contained in the set of points obtained from intersecting the two surfaces. FIG. 6 illustrates this situation. When the curve cv1 which lies on the surface sf1 is intersected with the surface sf2, an intersection point 27 results which lies on the intersection track 29 of the two surfaces sf1 and sf2. When the curve cv2 which lies on the surface sf2 is intersected with the surface sf1, an intersection point 28 results which is also on the intersection track 29.

In real situations occurring in a CAD system, however, the curves do not exactly lie on surfaces due, for example, to numerical errors. A typical situation is shown in FIG. 3. These deviations from the mathematically exact situation can lead to certain inconsistencies of the geometric object. The perturbation method of the present invention basically corrects the various resulting inconsistencies by "moving" intersection points along curves until they lie on the desired surface/surface intersection. The target point of this movement can be found by a curve/curve intersection algorithm which calculates the intersection between the surface/surface intersection track and the curve whose intersection point is off the intersection track. Curve/curve intersection algorithms as such are known, for example the closest point calculation, and is thus not further described.

In the following, the various types of inconsistencies which may arise in real situations when performing a Boolean operation and which are corrected by the perturbation method of the present invention will be described with reference to FIGS. 7 to 10. Each of the FIGS. 7 to 10 only deals with the intersections of two surfaces and a curve lying in one of the surfaces. It is understood that the intersection operations and the subsequent corrections by perturbation shown in FIGS. 7 to 10, respectively, will have to be applied several times with different curves and surfaces in order to fully execute the desired Boolean operation (compare FIG. 5). FIGS. 7 to 10 show the basic elements of the method which, in order to complete the Boolean operation, will have to be repeated the appropriate number of times until the entire geometric object has been constructed. While FIGS. 7 to 10 illustrate the basic principles of the method of the invention using various examples of geometric inconsistencies arising in real CAD situations, a complete description of the method will be made in connection with the flow chart in FIGS. 11a and 11b.

Figure 7:
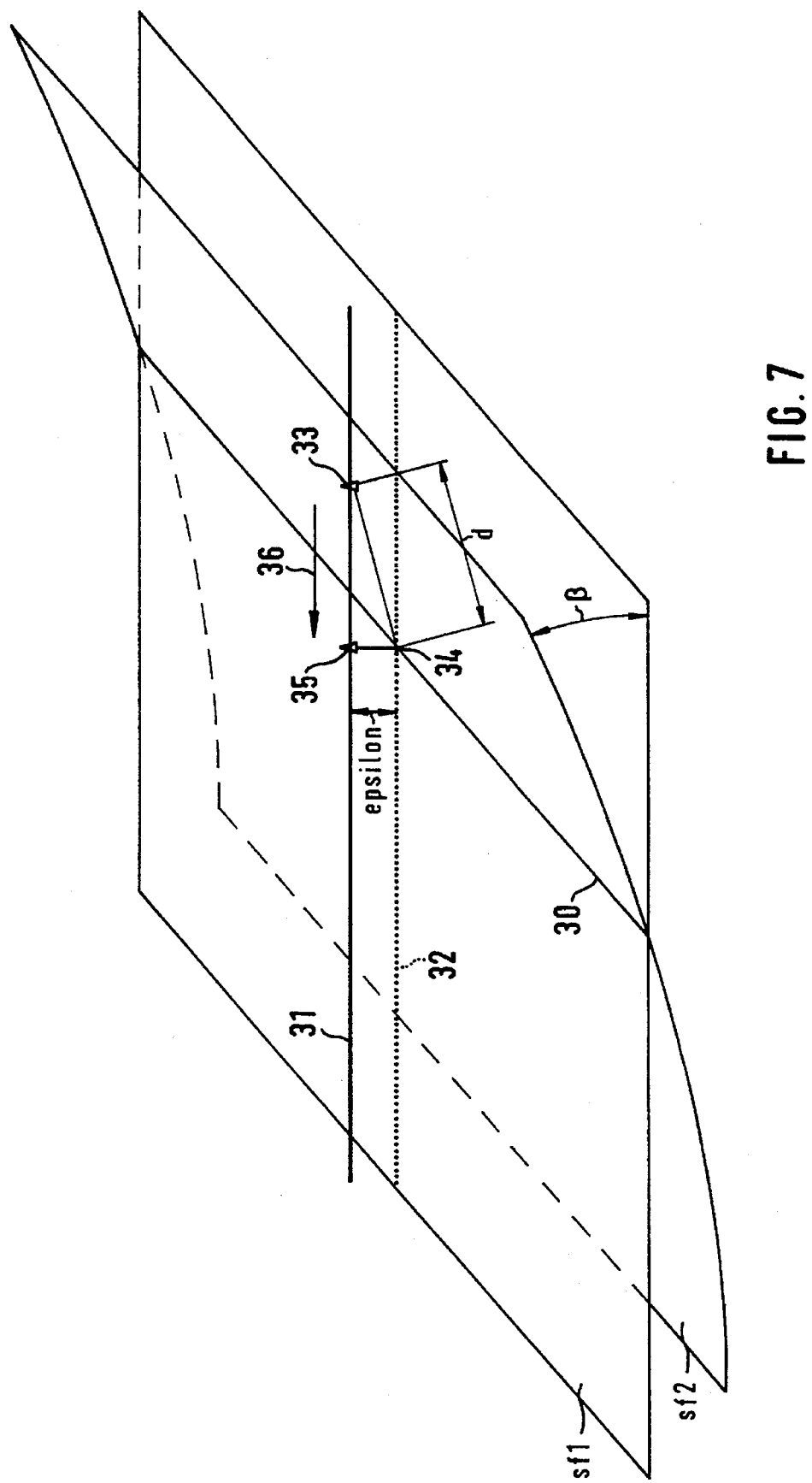
FIG. 7 shows a first example for intersections in a real situation and a way to correct resulting errors according to the invention.
Figure 8:
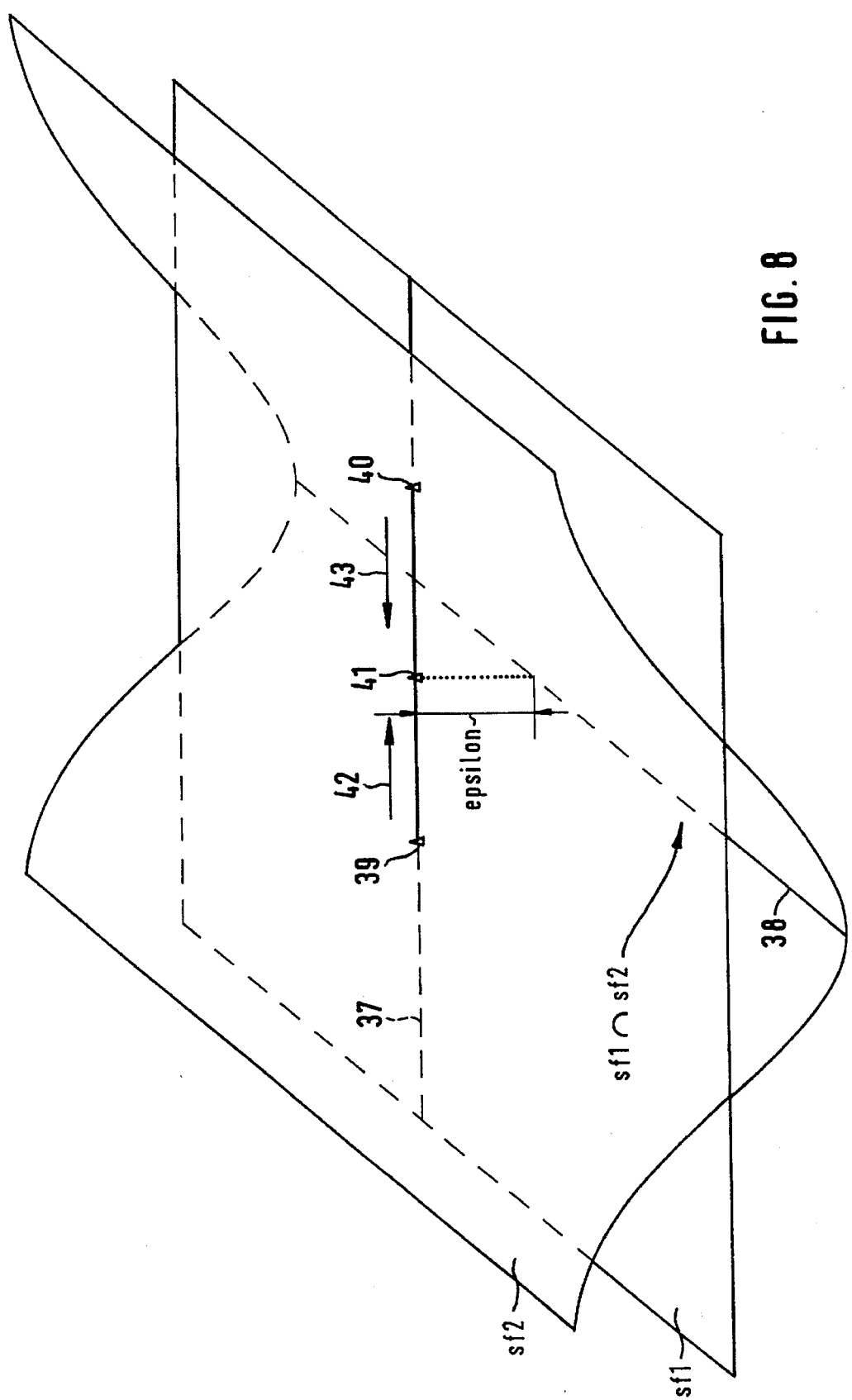
FIG. 8 shows a second example for intersections in a real situation including error correction according to the invention.
Figure 9:
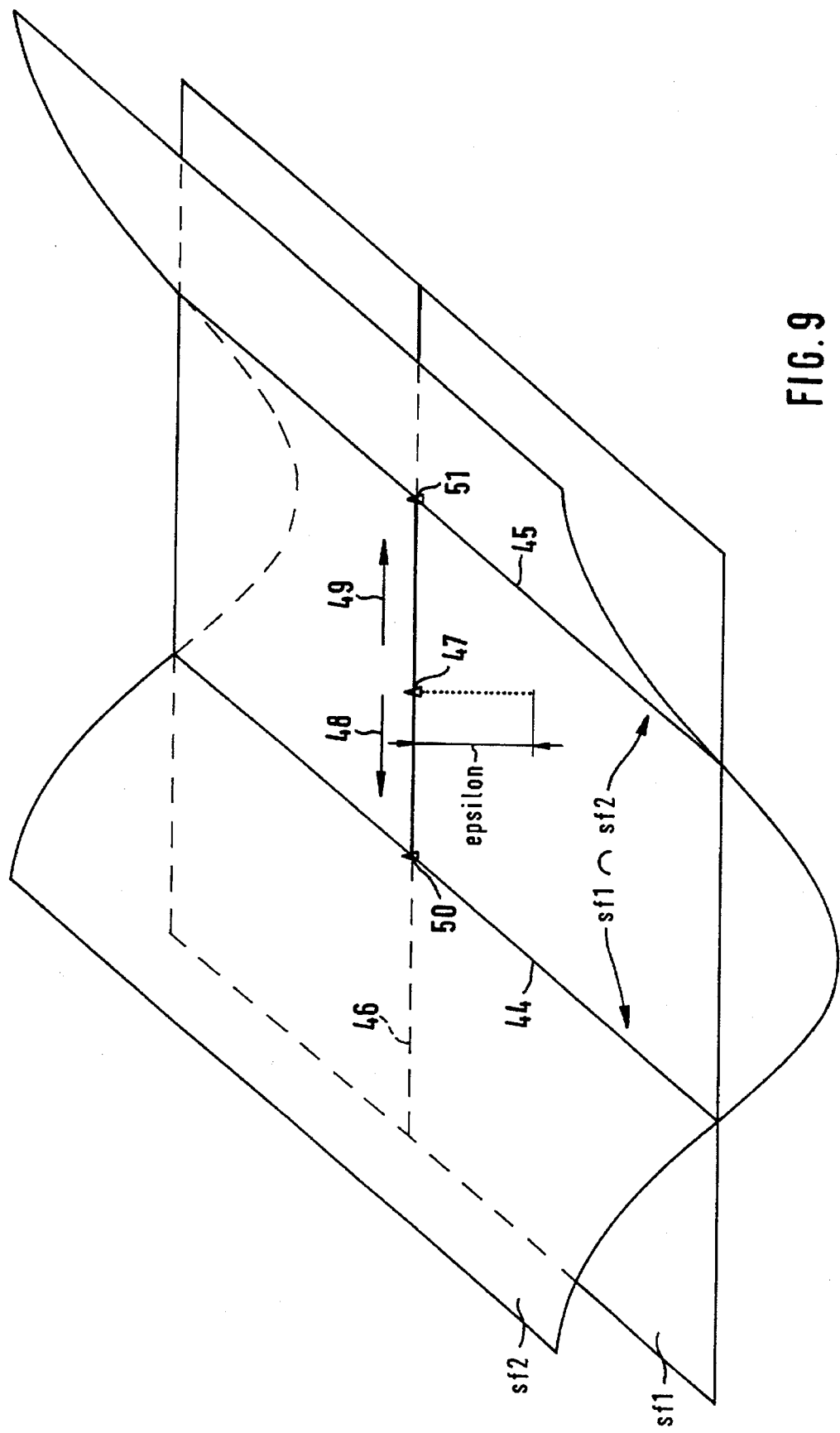
FIG. 9 shows a third example for intersections in a real situation including error correction according to the invention.
Figure 10:
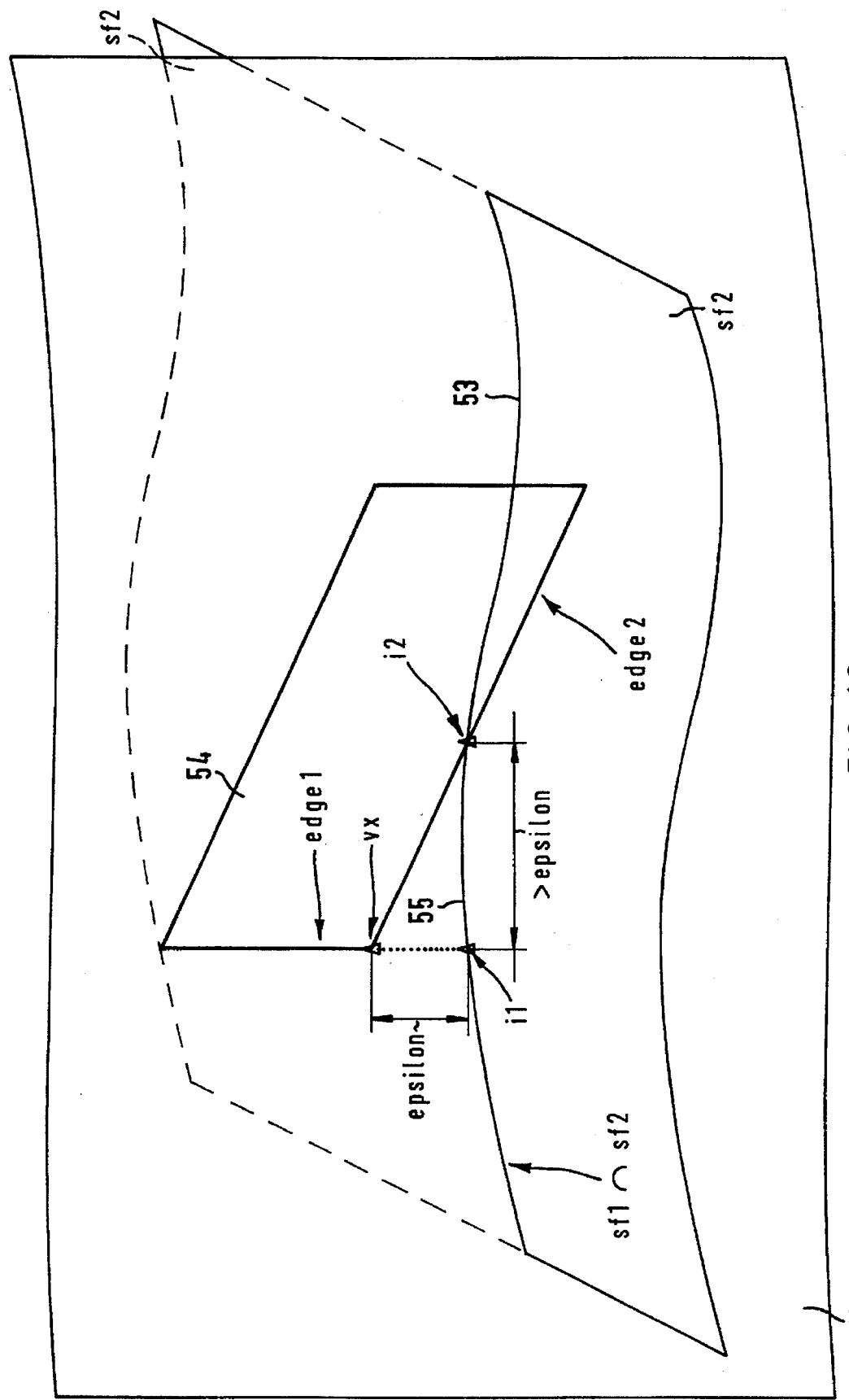
FIG. 10 shows a third example for intersections in a real situation including error correction according to the invention.

The inconsistencies mentioned in the previous chapters can be divided into two classes:

1. Inconsistencies that arise in the context of intersections between tangential or almost tangential surfaces. In such a situation, a small error in the orthogonal direction of a surface results in a larger error in the direction of the surface. Corresponding examples are shown in FIGS. 7 to 9.
2. Inconsistencies arising in the context of curves which are almost coincident with a surface/surface intersection track. A corresponding example is shown in FIG. 10.

The first class can be subdivided in three cases:
a) One curve/surface intersection point with one intersection track (FIG. 7).
b) Two curve/surface intersection points with one intersection track (FIG. 8).
c) One curve/surface intersection point with two intersection tracks (FIG. 9).

Case a) will now be explained with reference to FIG. 7. For the sake of clarity, the faces of the geometric objects with which a Boolean operation is to be performed have been omitted and only the surfaces sf1 and sf2 wherein such faces lie are shown. The surfaces sf1 and sf2 are almost tangential; they intersect each other under a small angle β. The intersection track is denoted with reference numeral 30. Due to numerical errors in the CAD system, the curve 31 does not lie exactly in the surface sf1 wherein it is supposed to be in the ideal (mathematically exact) situation illustrated by the curve 32 (dotted lines). However, since the curve 31 is not further away from the surface sf1 than the resolution epsilon, it is considered to lie in that surface. As the curve 31 is off the surface sf1, its intersection 33 with the surface sf2 differs from the ideal intersection point 34 which would result from the intersection of the ideal curve 32 with the surface sf2 and which would lie on the intersection track 30. If the angle between the two surfaces becomes small, i.e., in case of almost tangential intersection between the surfaces, the distance d between the ideal intersection point 34 and the real intersection point 33 becomes large as compared to the resolution epsilon. The following relationship applies:

$$d = \text{epsilon}/(\sin \beta).$$

When the distance d is larger than the resolution epsilon, the intersection point 33 cannot be assigned to the intersection track any more. The method of the invention removes this inconsistency by moving the intersection point 33 in the direction of the arrow 36 towards the closest point 35 between the intersection track 30 and the curve 31. Since the distance between the new point 35 and the intersection track 30 does not exceed the resolution epsilon, the point 35 can now be assigned to the intersection track so that consistency is established. The perturbed point 35 forms an end point of an intersection graph which has to be determined for performing the Boolean operation as explained in connection with FIG. 5. Even though an additional error is introduced by moving the original intersection point 33 to the perturbed position 35, the overall result is still better than before the perturbation, since the new point 35 can now be assigned to the intersection track 30.

FIG. 8 illustrates the above mentioned case b.). A surface sf1 and a cylinder-like surface sf2 intersect each other. The surface sf1 penetrates the surface sf2 by a distance which is equal or less than the numerical resolution epsilon. Thus, the intersection algorithm returns only one intersection track 38, even though there should be two intersection lines in the mathematically exact situation as becomes apparent from FIG. 8. A curve 37 lying on the surface sf1, however, produces two distinct intersection points 39 and 40 with the surface sf2. These points are much more than epsilon off the intersection track 38 and are therefore not assigned to the intersection track. The perturbation method of the present invention removes this inconsistency by moving the point 39 in the direction 42 and the point 40 in the direction 43 until these points are contracted into a single point 41 which is not farther than epsilon away from the intersection track 38. The new point 41 can thus be assigned to the intersection track 38, whereby the required consistency is established.

FIG. 9 illustrates the above mentioned case c.). In this case, the intersection between the two surfaces sf1 and sf2 returned two distinct intersection tracks 44 and 45. The intersection between the curve 46 lying on the surface sf1 and the surface sf2 returned only one point 47, due to the limited numerical resolution (epsilon). In order to correct this inconsistency, the perturbation method splits the single intersection point 47 into two points and moves these points in the directions of the arrows 48 and 49, respectively, along the curve 46 to the closest positions 50, 51 relative to the two intersection tracks 44 and 45, respectively.

FIG. 10 illustrates the above mentioned second class of inconsistencies wherein curves are almost coincident with a surface/surface intersection track. A face 54 is shown which is defined on a vertical surface sf1. A second surface sf2 intersects the surface sf1 in an intersection track 53. As shown in FIG. 10 the lower boundary "edge2" of the face 54 is almost coincident with the surface/surface intersection track 53. The lower boundary "edge2" of the face 54 produces only one intersection point i2 when intersected with sf2. The left bounding edge "edge1" of the face 54 intersects sf2 at the point i1 because the distance to sf2 is smaller than or equal to the resolution epsilon. Since the two points i1 and i2 are more than epsilon apart, the creation of a vertex containing both intersection points fails, and the calculation of the intersection graph would not be possible.

The perturbation algorithm detects the inconsistency because the surface/surface intersection track 53 seemingly enters the face 54 at the subsequent points i1 and i2 which is an impossible situation. In a consistent situation, the intersection track can only leave a face at an intersection point (or a cluster of intersection points which are not further than epsilon apart) after it has entered the face at another intersection point or a cluster of intersection points (see, e.g., FIG. 5), but it is not possible that the intersection track enters the face at two successive intersection points. In order to resolve the inconsistency shown in FIG. 10, the perturbation algorithm moves the point i2 along the intersection track 53 to the position of the point i1 and merges it with i1. The movement of i2 is indicated by the arrow 55.

Figure 11A:
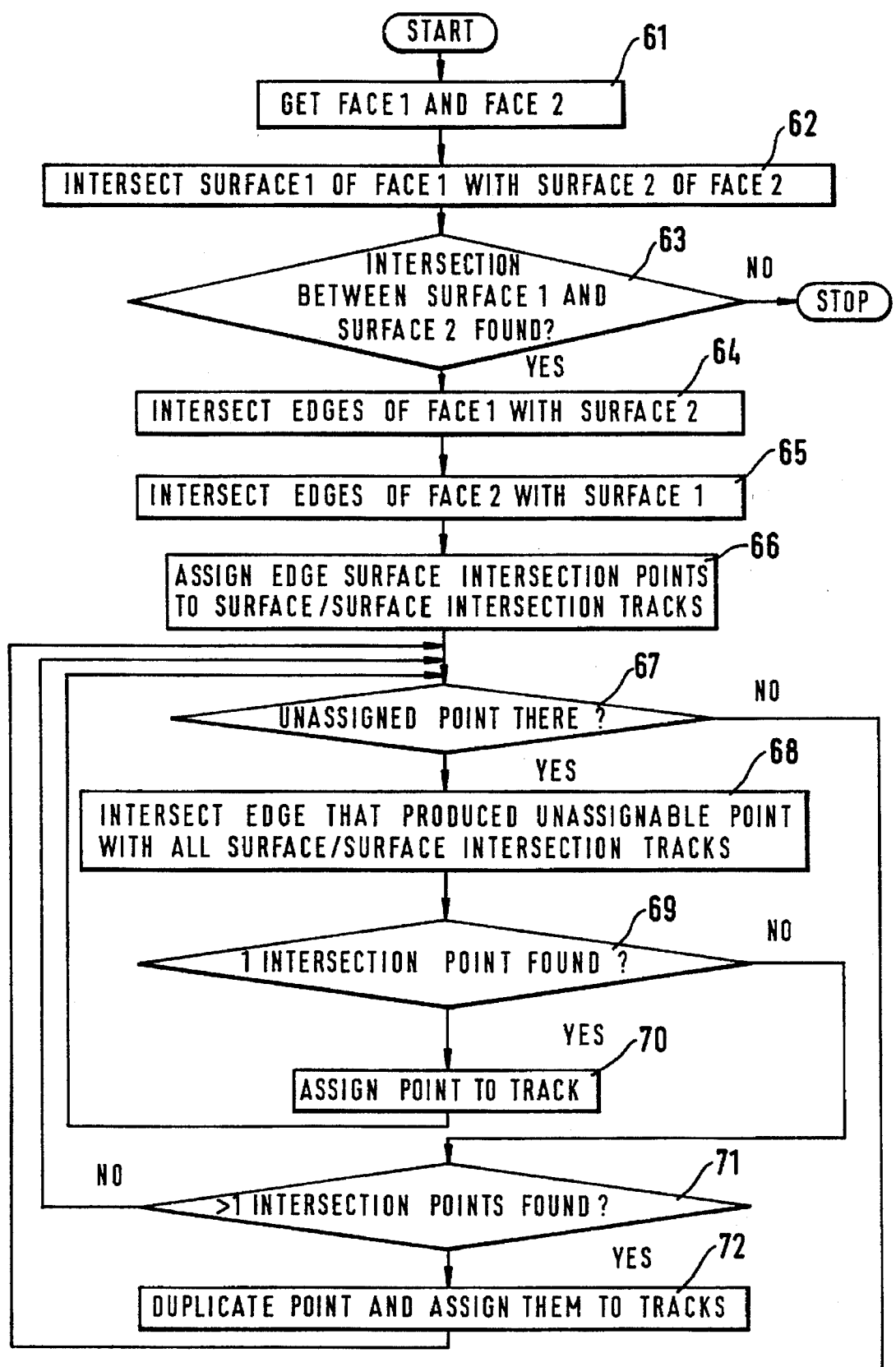
FIGS. 11a–b show a flow chart describing an embodiment of the invention.
Figure 11B:
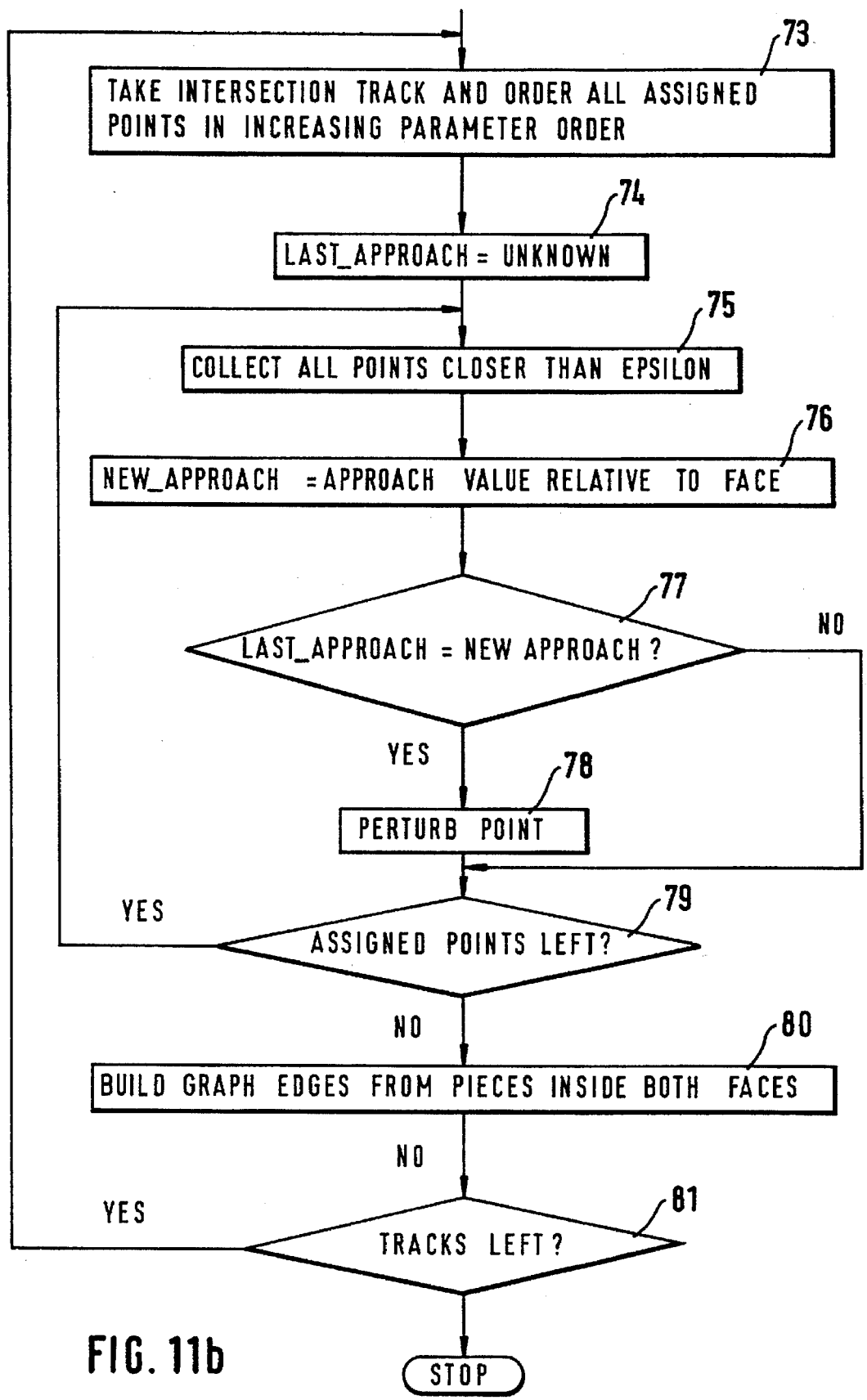

In the following, the method of the invention will be explained with reference to the flowchart shown in FIGS. 11a and 11b. The flowchart describes the method for performing Boolean operations that takes a face from each object, intersects them and generates a graph edge from the pieces of the intersection track(s) inside both faces. The entirety of all graph edges built from the various combinations of face/face intersections forms the intersection graph. The first part of the method ("Intersection") substantially corresponds to the steps shown in FIG. 11a, and the second part ("Graph Edge Construction") substantially corresponds to the steps according to FIG. 11b.

INTERSECTION

In the first step according to block 61 of the flow chart, a face "face 1" is taken from a first geometric object or body and another face "face 2" is taken from a second body. A typical example for two such bodies is shown in FIG. 2. For simplicity, it will be assumed that the two faces have a geometric configuration similar to that shown in FIG. 5.

In the next step according to block 62, the surface ("surface 1") wherein face 1 lies is intersected with the surface ("surface 2") wherein face 2 lies. In block 63 it is checked if any intersection tracks between the two surfaces exist. If no intersection is found, the algorithm is finished. If there is an intersection, face1 is intersected with surface 2 as shown in block 64. Also the edges of face 2 are intersected with surface 1 as shown in block 65. The intersection points returned from these edge/surface intersections must then be associated (or "assigned") with the surface/surface intersection tracks found in a previous step. This assignment is required in order to be able to find the trimming points that bound the intersection graph g (see FIG. 5).

The assignment is performed in block 66 using Euclidean distances of the point with respect to the intersection track. A point is considered assigned, if a track is found whose distance from the point is smaller than or equal to the resolution epsilon.

In numerically stable geometry configurations like the one shown in FIG. 6, all points will be assigned. In such a case, the algorithm will immediately proceed to block 73 (FIG. 11b). In cases with tangential or almost tangential configurations like those shown in FIGS. 7, 8 and 9, the assignment will fail since the intersection point is farther than epsilon away from the intersection track. If the assignment has failed, the loop to process the unassigned points will be entered. This loop consists of blocks 68 to 72.

The first action to resolve the inconsistency is to intersect the edge that produced the inconsistency with all surface/surface intersection tracks returned from block 62. Depending on the number of intersection points found (block 69 or block 71), the appropriate perturbation method is applied. If one curve/curve intersection point is found according to block 9, the unassigned point is relocated (perturbed) to that curve/curve intersection point according to block 10. After the perturbation, the algorithm goes back to process the next point.

The just described process steps are illustrated in FIGS. 7 and 8. In FIG. 7, the point 33 is unassigned because it is more than epsilon away from the intersection track 30. Consequently, it is relocated to the point 35 which corresponds to the intersection (within the resolution epsilon) of the intersection track 30 with the curve 31. In FIG. 8, the points 39 and 40 are unassigned. Consequently, they are both relocated to the point 41 which corresponds to the intersection (within the resolution epsilon) of the curve 37 with the intersection track 38.

If more than one curve/curve intersection point is found according to block 71, the unassigned point is duplicated n times, where n is the number of curve/curve intersection points found. Each duplicated point is then repositioned (perturbed) to one curve/curve intersection point. This situation is illustrated in FIG. 9. The point 47 is unassigned as it is more than epsilon off the two intersection tracks 44 and 45. The point 47 is then split into two points which are moved to the points 50 and 51, respectively, which correspond to the intersections of the curve 46 with the intersection tracks 44 and 45, respectively. Then, according to block 67, the next unassigned point is processed.

GRAPH EDGE CONSTRUCTION

After the perturbation of the unassigned edge/surface intersection points the graph edges are built. In order to do that, each surface/surface intersection track and the edge/surface intersection points assigned to that track are taken, and the points are ordered in increasing parameter order (block 73). Intersection points that are indistinguishable in the current resolution (epsilon) are put into a common cluster. A cluster is a structure that represents the points belonging to it as if they were one single point. Then the algorithm proceeds along the surface/surface intersection track computing the so called face approach value whenever it comes past a cluster. The face approach value is a symbolic value and indicates whether the intersection track enters, leaves, or touches the face at the cluster.

According to block 74, the first face approach value is initialized to UNKNOWN for each intersection track. Then, in block 75, the point cluster is built from the lowest (in parameter order) assigned point which does not belong to a cluster and all its successors that are closer than the resolution epsilon. Block 76 then determines the face approach value at that point cluster with respect to both faces. If the same approach value is detected twice for the same face (block 77), a geometric configuration as in FIG. 10 results. In FIG. 10, the two intersections i1 and i2 are not coincident due to a shallow intersection of edge2. The geometric interpretation of equal approach values is that the intersection track enters or leaves the face at successive points on the track. This is a contradictory situation because a track entering a face must leave the face before it can enter the face again. To resolve the contradiction into a meaningful situation, the point i2 in FIG. 10 is relocated (perturbed) to the point i1 along the intersection track 53 so that it will belong to the same cluster as the vertex vx. This cluster will then produce a unique face approach value.

The check in block 79 makes sure that the forming of point clusters and conflict resolution is performed for all points assigned to an intersection track. Then, according to block 80, graph edges are constructed from the segments of the intersection track that are inside both intersected faces. The result are graph edges similar to the edge g shown in FIG. 5.

Finally, it is ensured by block 81 that all surface/surface intersection tracks are processed. If it is necessary for performing the Boolean operation that additional faces are intersected with each other, the above described process will be repeated with these faces and produce additional graph edges. From all these graph edges and the non-intersected pieces of the original geometric objects with which a Boolean operation is to be performed, the result of the operation can be constructed and displayed on the display means of the CAD system.

The examples given above have been kept simple for the purpose of easier explanation. It is understood, however, that the surface and curve geometries are not restricted in any respect. The perturbation method of the invention can be applied to all geometries which a CAD system supports.

I claim:

1. A method for performing Boolean operations on geometric objects in a computer-aided design system for generating a modified geometric object, wherein a face of a first geometric object and a face of a second geometric object are intersected to generate a graph edge forming an edge of the modified geometric object, comprising the steps of:

a) intersecting an edge of the first geometric object with a surface containing a face of the second geometric object for producing intersection points, b) intersecting a surface containing a face of the first geometric object with said surface containing a face of the second geometric object for producing intersection tracks, c) determining if distances between the intersection points and the intersection tracks are smaller than a resolution value (epsilon), respectively, d) correcting the spatial positions of the intersection points, if the distances determined in step c) are larger than the resolution value (epsilon), respectively.

2. A method as in claim 1, wherein step d) comprises:

moving the intersection points along said edge of said first geometric object to positions where the distances to the intersection tracks are a minimum, respectively.

3. A method as in claim 1, wherein step d) comprises:

merging two intersection points produced by the intersection of said edge with said surface containing a face of said second geometric object into a single corrected intersection point, if the intersection of said edge with said intersection tracks produces only one intersection point.

4. A method as in claim 1, wherein step d) comprises:

splitting an intersection point produced by the intersection of said edge with said surface containing a face of said second geometric object into n corrected intersection points, if the intersection of said edge with said intersection tracks produces n intersection points.

5. A method as in claim 1, wherein:

e) the intersection points between said face of said first object and said intersection track are ordered, f) a face approach value is associated with each intersection point describing if said face is entered or left when proceeding along the intersection track in the order defined in step e), g) the position of an intersection point is corrected, if the face approach value associated with that intersection point is the same as the face approach value associated with the intersection point which occurs prior to that point in the order defined in step e).

6. A method as in claim 5, wherein intersection points which are closer to each other than the resolution value (epsilon) are combined to a cluster which is treated as a single intersection point.

7. A computer-aided design system, comprising:

input means for entering commands and data for creating and modifying geometric objects, processing means for performing calculations for creating and modifying the geometric objects, memory means for storing a representation of the geometric objects and for storing instructions relating to the creation and modification of the objects, display means for displaying the geometric objects and for displaying the results of Boolean operations on the geometric objects, wherein the processing means and the memory means are operative to perform the method of: intersecting an edge of a first geometric object with a surface containing a face of a second geometric object for producing intersection ponts; intersecting a surface containing a face of the first geometric object with said surface containing a face of the second geometric object for producing intersection tracks; determining if distances between the intersection points and the intersection tracks are smaller than a resolution value (epsilon), respectively; and correcting spatial positions of the intersection points if the distances determined are larger than the resolution value (epsilon), respectively.

* * * * *